United States Patent [19]

Washizawa

[11] Patent Number: 4,856,373
[45] Date of Patent: Aug. 15, 1989

[54] AXLE ASSEMBLY

[75] Inventor: Yoshikazu Washizawa, Saitama, Japan

[73] Assignee: Honda Giken Kogyo Kabushiki Kaisha, Tokyo, Japan

[21] Appl. No.: 14,157

[22] Filed: Feb. 11, 1987

Related U.S. Application Data

[63] Continuation of Ser. No. 572,153, Jan. 17, 1984, abandoned.

[30] Foreign Application Priority Data

Jan. 17, 1983 [JP] Japan .................................. 58-5706
Mar. 24, 1983 [JP] Japan ............................ 58-42696[U]

[51] Int. Cl.[4] ........................ F16H 1/44; F16H 57/10
[52] U.S. Cl. .................................... 74/710.5; 74/711;
74/713; 74/777; 74/665 GB; 192/6 R
[58] Field of Search .................... 74/710.5, 710, 711,
74/713, 714, 757, 768, 777, 783, 786, 665 GB,
665 T; 192/5, 6 A, 6 R; 188/72.2, 72.7, 18 A;
180/210, 215

[56] References Cited

U.S. PATENT DOCUMENTS

| 1,290,031 | 1/1919 | Adler | 74/417 |
|---|---|---|---|
| 2,894,416 | 7/1959 | Scott | 74/710.5 |
| 2,913,928 | 11/1959 | Double | 74/710.5 |
| 3,048,241 | 8/1962 | Kelly et al. | 188/18 A |
| 3,199,374 | 8/1965 | O'Malley et al. | 188/72.2 |
| 3,261,230 | 7/1966 | Rudnicki | 74/710.5 |
| 3,369,428 | 2/1968 | Hughson | 74/710.5 |
| 3,474,689 | 10/1969 | Young | 74/711 |
| 3,517,572 | 6/1970 | Schmid | 74/710.5 |
| 3,621,957 | 11/1971 | Howe | 74/710.5 |
| 3,642,103 | 2/1972 | Schott | 74/710.5 |
| 3,651,897 | 3/1972 | Hahn | 188/72.7 |
| 3,674,118 | 7/1972 | Klaue | 188/72.2 |
| 3,952,843 | 4/1976 | Campbell et al. | 188/72.7 |
| 3,956,945 | 5/1976 | Eggleton et al. | 74/710.5 |
| 4,016,957 | 4/1977 | Osujo et al. | 188/72.7 |
| 4,294,334 | 10/1981 | Shinoda et al. | 188/18 A |
| 4,352,415 | 10/1982 | Powell | 188/72.2 |
| 4,489,801 | 12/1984 | Marier | 188/72.2 |

FOREIGN PATENT DOCUMENTS 1457512 12/1976 United Kingdom .............. 188/72.7

Primary Examiner—Leslie A. Braun
Assistant Examiner—William Gehris
Attorney, Agent, or Firm—Lyon & Lyon

[57] ABSTRACT

A vehicle axle assembly employed on a powered tricycle having differential gearing and a brake assembly contained within the gear case of the rear axle. The brake assembly includes multiple brake disks against which a pressure plate acts to initiate braking. A cam plate is arranged adjacent the pressure plate with follower elements between the plates such that rotation of the cam plate results in axial displacement of the pressure plate against the brake disks. The surface of both the cam plate and the pressure plate are shown to be arranged in profile to provide rapid advancement and acceptable mechanical advantage.

10 Claims, 5 Drawing Sheets

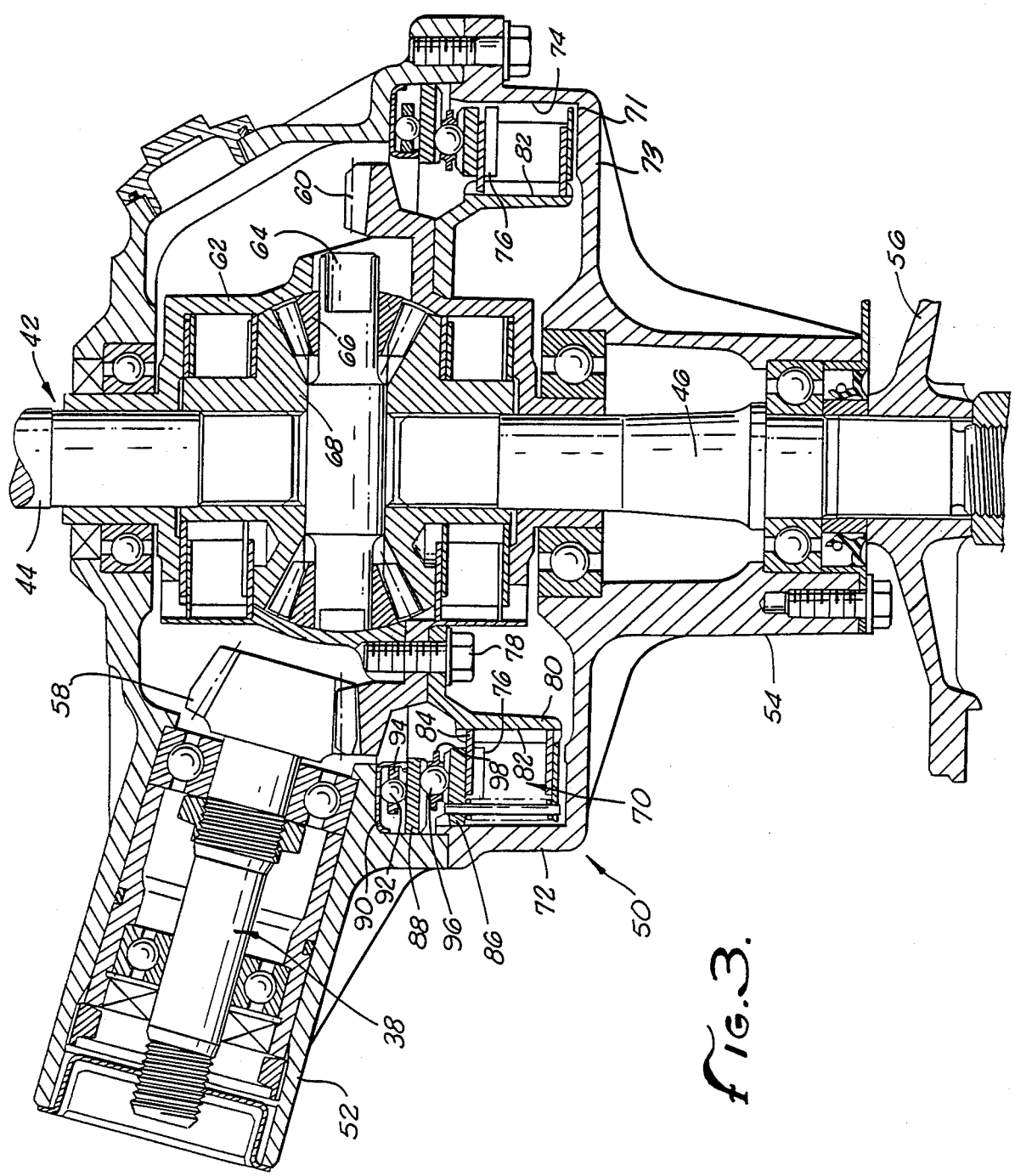

AXLE ASSEMBLY

This application is a continuation of application Ser. No. 572,153 filed 1/17/84, now abandoned.

BACKGROUND OF THE INVENTION

The field of the present invention is axle assemblies for vehicles including braking devices associated therewith.

Small vehicles for off-road use have been developed which employ an axle assembly for mounting balloon tires and providing motive power. Such assemblies often include a differential gear mechanism and outboard braking. With the use of differentials and the like, the assemblies become somewhat complicated and may become relatively heavy. The addition of braking mechanisms associated with the hub of the axle adds further complication and weight.

The employment of such vehicles which may be three or four wheels is often contemplated for off-road use in sand, dirt and rough ground. Under some such conditions, it can become advantageous to install equalizing mechanisms for equal braking effect on both sides of the vehicle. Consequently, expensive hydraulic systems for both wheels of the axle assembly may be advantageous. Additionally, the use contemplated for such devices may suggest that complete shielding is required for the brake system on each wheel. Such shielding can be heavy and expensive and result in brake ouerheating problems. Consequently, reduction in complexity of such axle assemblies would be greatly advantageous. Additionally, increased efficiency and performance of a simplified braking system would also be of great advantage.

SUMMARY OF THE INVENTION

The present invention is directed to an axle assembly for a vehicle for supplying both power and braking to the wheels thereof. Advantageously, a friction brake may be incorporated within the gear case of a rear axle assembly to effectively provide braking forces between the gearing of the axle assembly and the nonrotating gear case. Such an arrangement is relatively simple and cost effective. The single brake thereby provides braking to both wheels associated with the axle assembly and is removed from the hostile environment for which such vehicles are often intended.

In further aspects of the present invention, a specific braking device is contemplated as including friction disks actuated by a pressure plate located within the gear case. The braking device may be positioned between a ring gear of the gearing associated with differential gearing. Such a system is compact, relatively simple and easily actuated by a camming system.

In the further aspects of the present invention, the pressure plate associated with the friction plate may be actuated by a cam mechanism. The cam mechanism is arranged to provide a first cam surface section which is steeper in cam profile than a second cam surface section. Advantageously, the first section provides greater travel of the pressure plate upon initial brake application to insure rapid engagement of the friction brake. The second section provides increased mechanical advantage with reduced pressure plate motion for greater braking control and increased braking force.

Accordingly, it is an object of the present invention to provide an improved axle assembly providing both power and braking to associated wheels of the vehicle. Other objects and advantages will appear hereinafter.

BRIEF DESCRIPTION OF THE DRAWINGS

FIG. 3 is a cross-sectional plan view of a gear case of the present invention.

DETAILED DESCRIPTION OF THE PREFERRED EMBODIMENTS

Figure 1:
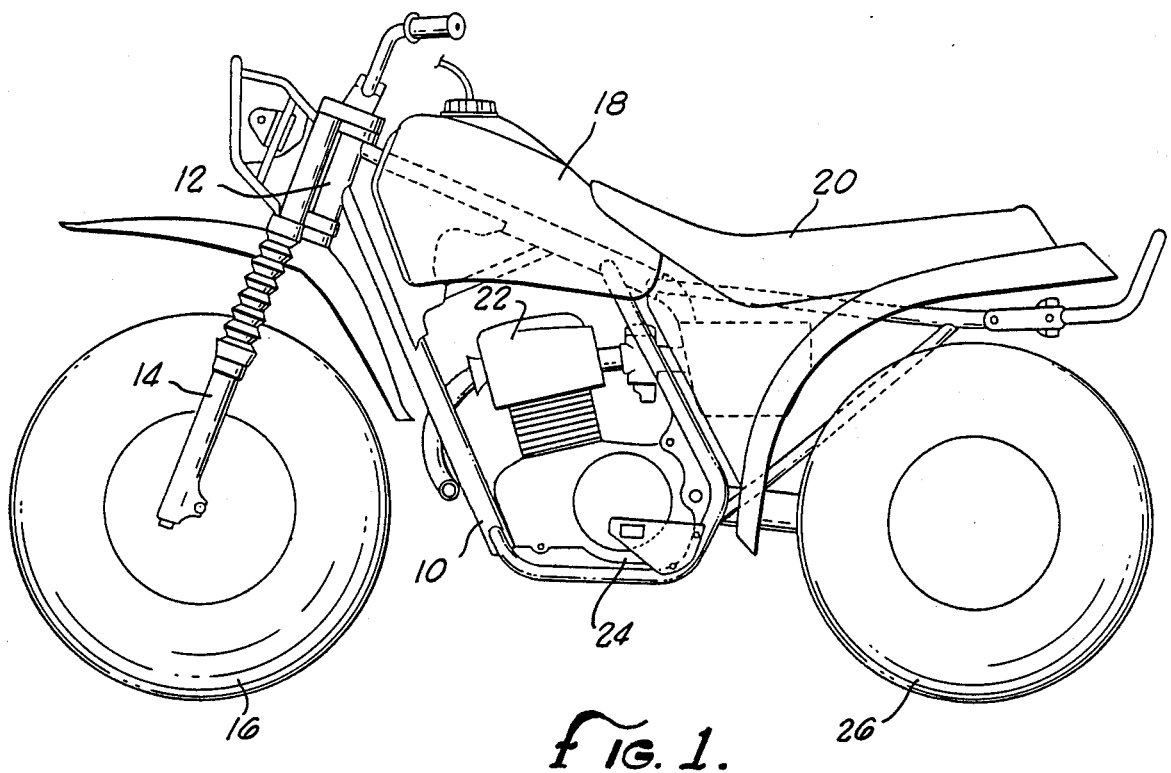
FIG. 1 is a side elevation of a tricycle which may employ the present invention.

Turning in detail to the drawings, a tricycle is illustrated in FIG. 1 which might advantageously employ a device of the present invention. The tricycle includes a body frame 10 having a head tube 12. A front fork and steering assembly 14 extends to a front balloon tire 16. Mounted to the frame are a gas tank 18, a seat 20, an engine 22 and a transmission 24. Two rear wheels 26 are mounted to a rear axle assembly (not visable).

Figure 2:
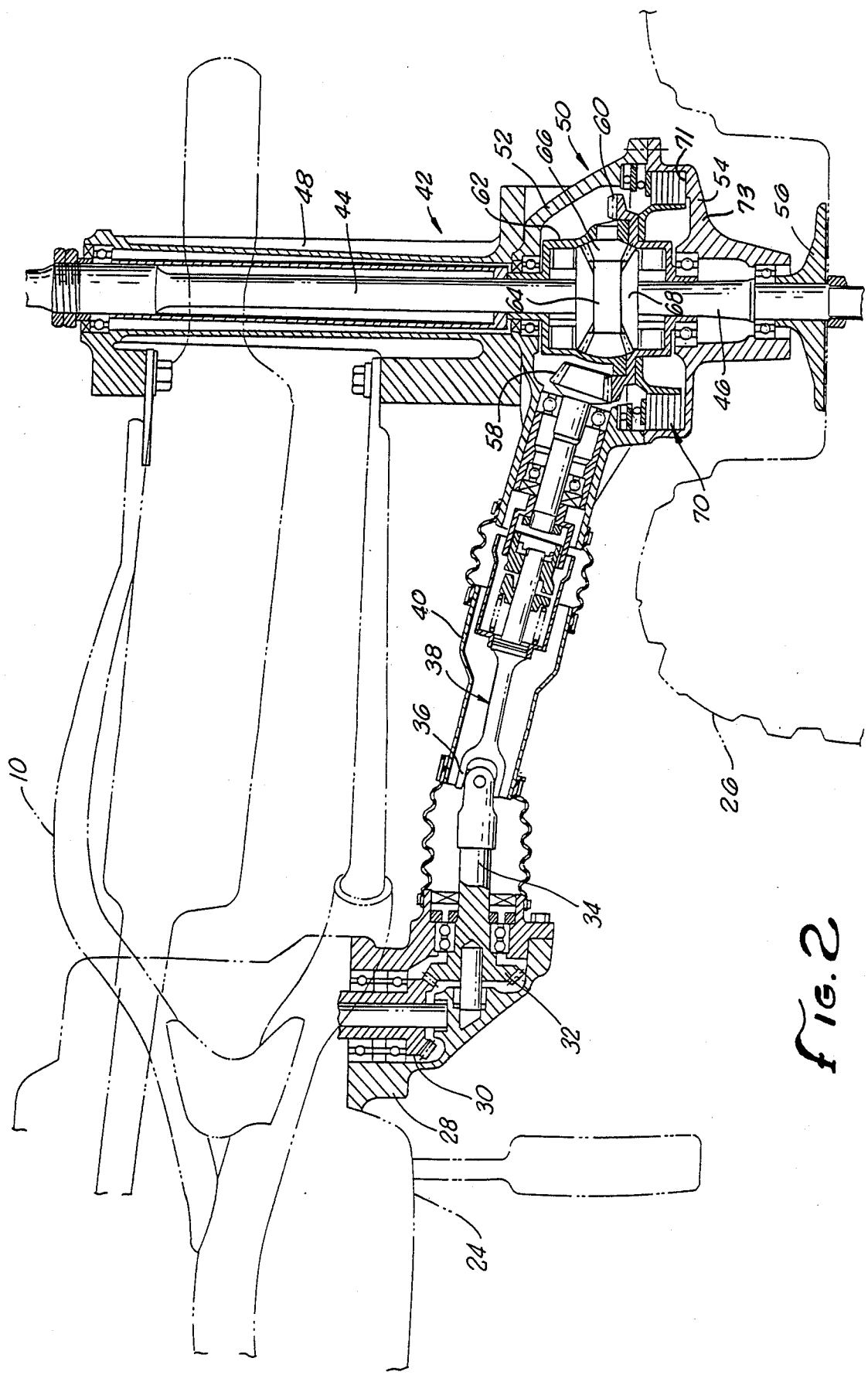
FIG. 2 is a cross-sectional plan of drive train of the tricycle of FIG. 1.

FIG. 2 illustrates a rear axle assembly of the type which may be associated with the tricycle of FIG. 1. Associated with the transmission case 24 is an extension to that case 28 within which are mounted two bevel gears 30 and 32. The bevel gears 30 and 32 direct power from the transmission through a rearwardly extending middle shaft 34. Associated with the middle shaft 34 by means of a universal joint 36 is a drive shaft assembly generally designated 38. The drive shaft assembly 38 is contained within a housing and extends into the gear case of the rear axle assembly. As can be seen from FIG. 2, the drive shaft assembly 38 extends at an angle outwardly from near the centerline of the vehicle at the transmission case 24 to a rear axle assembly.

The rear axle assembly, generally designated 42 includes a first axle shaft 44 and a second axle shaft 46 contained within a housing 48. As part of the housing 48, a gear case 50 is positioned in the axle assembly, including a first portion 52 and a second portion 54. The axle shaft 46 mounted in bearings within the portion 54 of the gear case 50 while the axle shaft 44 is partially mounted in bearings within the portion 52 of the gear case 50 and extends outwardly to a remote bearing at the end of the rear axle case 48. Hubs 56 are associated with the axle shafts 44 and 46 for mounting of the rear wheels and tires 26.

Looking within the gear case 50, gearing is provided to transfer torque from the drive shaft assembly 38 to the axle shafts 44 and 46. A bevel gear 58 is fixed to the end of the drive shaft assembly 38 to engage a ring gear 60 associated with the case 62 of differential gearing. In the differential gearing, a shaft 64 is rotatably mounted within the differential case 62 and includes pinion gears 66 engaging bevel gears 68 on the ends of the axle shafts 44 and 46. Thus, power from the bevel gear 58 is directed to the ring gear 60, in turn driving the differential case 62. Power is then directed to the axle shafts 44 and 46 with conventional differential gearing.

A friction brake, generally designated 70 in FIG. 2 is contained within the gear case 50 of the rear axle assembly 42. A drum 72 is defined within the portion 54 of the gear case 50 for receipt of the friction braking mechanism 70. A drum pressure surface 71 is defined at the end radial wall portion 73 of the gear case 50. The internal annular surface of the drum portion 72 includes grooves 74 for receipt of a plurality of friction disks 76. The friction disks 76 are thus held in place from rotating relative to the gear case 50 but are allowed to move axially for compression. Associated with the ring gear 60 by means of fasteners 78 is the brake center defined by a cylindrical flange 80. The cylindrical flange 80 also includes cavities 82 running parallel to the groove cavity 74. The cavities 82 receive extensions of friction disks 84 which are alternately stacked with the friction disks 76. Consequently, friction disks 84 rotate with the ring gear 60 and friction disks 76 remain stationary. Through mutual compression of the disks, braking will occur.

To actuate the friction brake 70, an actuation means is provided. The actuation means includes a pressure plate 86 which is fixed from rotating by engagement with the groove cavity 74 of the gear case 50. The pressure plate 86 is able to move axially against the friction disks 84 and 76 to compress same together against the drum pressure surface 71 on the end radial wall portion 73 of the gear case 50 for braking action. The pressure plate 86 is conveniently a ring which extends about the differential case. Adjacent to the pressure plate 86 is a cam plate 88 which is also in the form of a ring. The cam plate 88 is rotatably mounted within the gear case 50 on a bearing 90 including balls 92 positioned within a ball cage 94. The cam plate 88 need only pivot through a short displacement as will be further illustrated below. Between the cam plate 88 and the pressure plate 86 are follower elements 96. The follower elements 96 are shown to be balls held within a ball cage 98. In this way, the cam followers 96 retain the pressure plate 86 and cam plate 88 in spaced relation.

Figure 4:
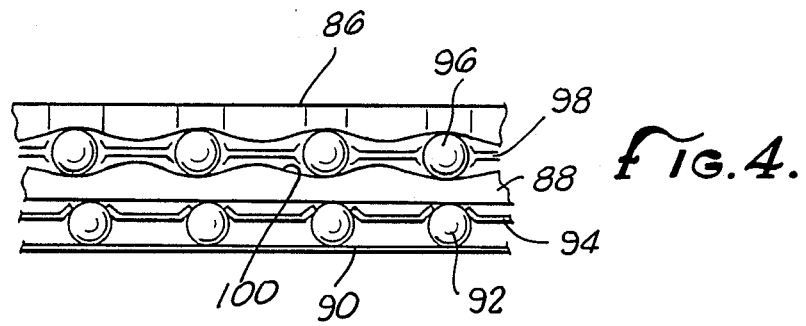
FIG. 4 is a detailed top view of an actuation mechanism of the present invention.

Looking specifically to FIG. 4, the actuation means is more fully illustrated. Of particular interest is the surface of the cam plate 88 which includes a plurality of cam surfaces 100. The cam surfaces illustrate a profile which act to advance the follower elements 96 when the cam plate 88 is rotated relative to the pressure plate 86. In thid way, the pressure plate 86 is forced axially against the friction disks 76 and 84 to effect braking.

Figure 5:
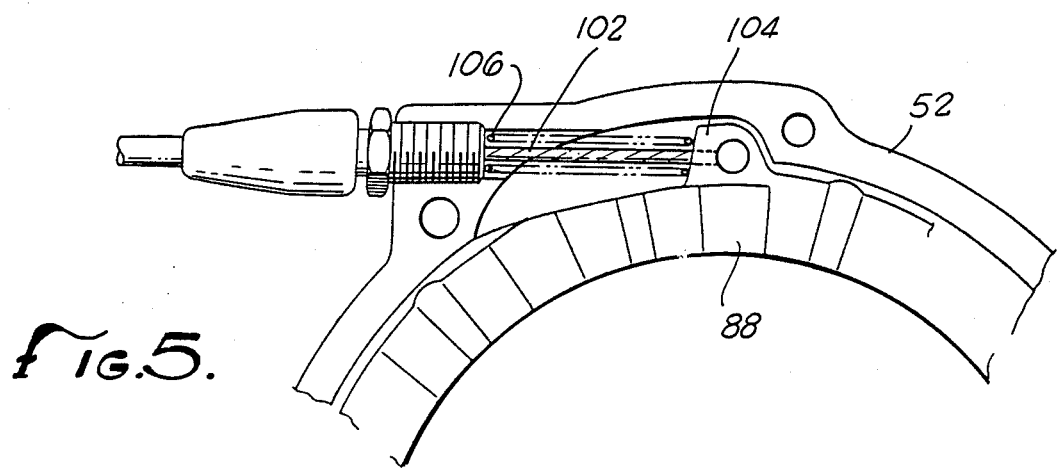
FIG. 5 is a detailed side view of the actuation mechanism of FIG. 4.

FIG. 5 illustrates a typical cable mechanism 102 engaging an attachment boss 104 on the cam plate 88 to cause rotation thereof for braking engagement. Thus, tension on the cable 102 will engage the pressure plate 86 against the brake disks for braking. Release of the cable 102 will cause the cam plate 88 to return to its initial position under the influence of a return spring 106.

Figure 6:
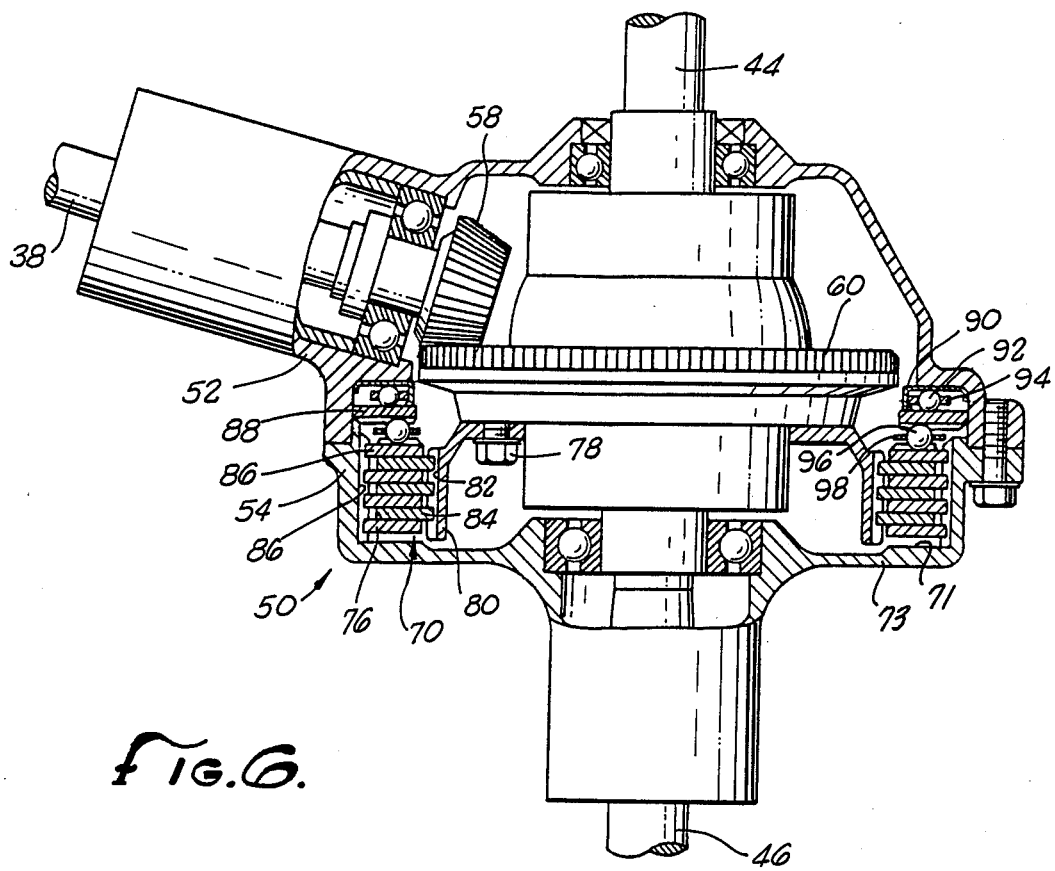
FIG. 6 is a cross-sectional plan view of a second embodiment of the present invention not specifically including differential gearing.
Figure 7:
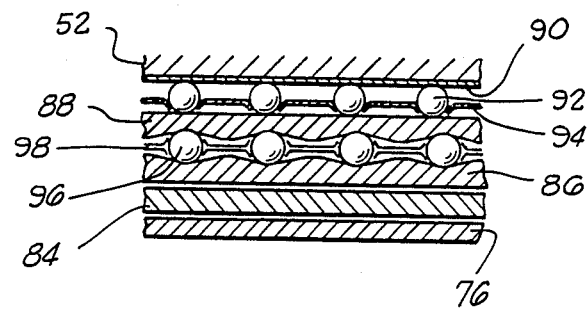
FIG. 7 is a top view of an actuation mechanism for the friction brake of FIG. 6.
Figure 8:
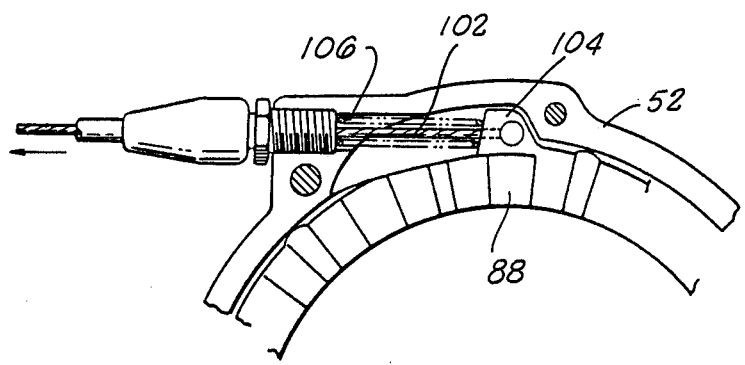
FIG. 8 is a side view of the actuation mechanism of FIG. 7.

Looking then to the embodiment of FIG. 6, the same reference numbers are employed for identical or equivalent components. The embodiment of FIG. 6 does not specifically illustrate a differential mechanism. Instead, a limited slip mechanism may be positioned within the center portion of the gear case 50. The principal illustration provided by the embodiment of FIG. 6 is illustrated in FIG. 9.

Figure 9:
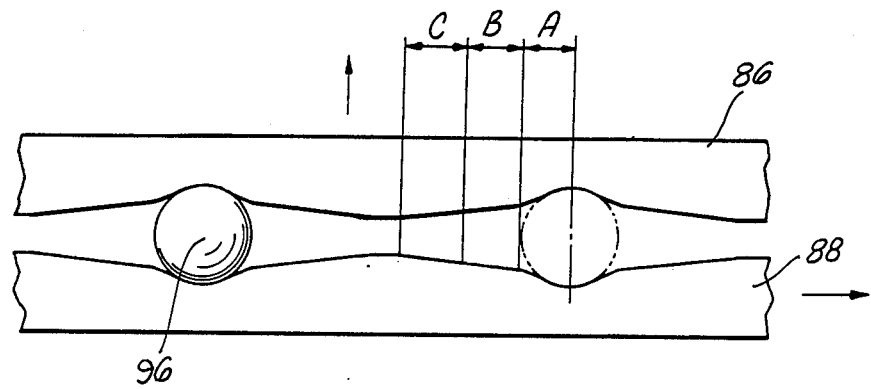
FIG. 9 is a detailed view of the cam plate and pressure plate of an actuation mechanism of the present invention.

In FIG. 9, the pressure plate 86 and the cam plate 88 both include camming surfaces. A first section of each of these surfaces, identified as "A", is steep in cam profile. A second section, identified as "B", is less steep than section A. A third section, identified as "C" provides stroke room as the brake disks may wear. The steep profile of section A provides quick displacement of the pressure plate 86 relative to the degree of rotation of the cam plate 88. The angle is designed to provide less brake lever throw and quick response to initially engage the friction brake. Section B is of milder slope to increase the mechanical advantage of the actuating means in applying braking force to the friction brake. At this point, greater brake lever throw is required to accomplish a similar advancement of the pressure plate. In this way, reasonable mechanical advantage and quick operation is provided.

Accordingly, an improved rear axle assembly employing an inboard braking system has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A rear axle assembly for a vehicle having two driven rear wheels and a vehicle frame, comprising:
   a gear case having a friction surface formed on the interior surface thereof;
   a rear axle housing joined to a first side of said gear case and supported by the vehicle frame midway between the rear wheels;
   a first rotatable axle shaft for driving a first of the rear wheels, said first axle shaft extending within said rear axle housing to said first side of said gear case;
   a drive shaft extending to said gear case; a second rotatable axle shaft for driving a second of the rear wheels, said second axle shaft extending to a second side of said gear case, said first side and said second side being oppisite sides on said gear case, said gear case being disposed offset from the centerline of the vehicle such that said gear case is adjacent to a second wheel;
   gearing in said gear case, said drive shaft and said axle shafts being coupled with said gearing, said gearing including a first gear wheel, the axis of said drive shaft being other than perpendicular to the axis of said gear wheel;
   a friction disk brake within said gear case between said first gear wheel and said friction surface; and
   actuation means for selectively securing said friction disk brake between said first gear wheel and said gear case.

2. The axle assembly of claim 1 wherein said first gear wheel is a ring gear.

3. The axle assembly of claim 1 wherein said gearing includes differential gearing.

4. An axle assembly for a vehicle having two driven rear wheels and a vehicle frame, comprising
   a gear case;
   a drive shaft extending to said gear case;
   a rear axle housing joined to a first side of said gear case and supported by the vehicle frame midway between the rear wheels;

a first axle shaft for driving a first of the rear wheels, said first axle shaft extending within said rear axle housing to said first side of said gear case;

a second axle shaft for droving a second of the rear wheels, said second axle shaft extending to a second side of said gear case, said gear case being disposed offset from the centerline of the vehicle such that said gear case is adjacent to the second wheel;

gearing in said gear case, said drive shaft and said axle shafts being coupled with said gearing, said gearing including a ring gear, the axis of said drive shaft and the axis of said ring gear defining an included angle of substantially greater than ninety degrees at said gear case;

a friction brake within said gear case coupling said ring gear and said gear case, said friction brake including friction disks, at least one said disk being fixed to rotate with said ring gear and at least one other said disk being fixed from rotation by said gear case, said friction brake being positioned in said included angle; and actuation means for engaging said friction brake to couple said ring gear and said gear case, said actuation means including a pressure plate compressing said friction disks together.

5. The axle assembly of claim 4 wherein said gearing includes differential gearing and there are two said axle shafts.

6. The axle assembly of claim 4 wherein said actuation means further includes a cam plate positioned adjacent said pressure plate, said cam plate being rotatably mounted in said gear case, at least one of said cam plate and said pressure plate including inclined surfaces facing the other of said cam plate and said pressure plate, and follower elements positioned between said cam plate and said pressure plate on said cam surfaces.

7. An axle assembly for a vehicle having two driven rear wheels and a vehicle frame, comprising a gear case;

a drive shaft extending to said gear case;

a rear axle housing joined to a first side of said gear case and supported by the vehicle frame midway between the rear wheel;

a first axle shaft for driving a first of the rear wheels, said first axle shaft extending within said rear axle housing to said first side of said gear case;

a second axle shaft for driving a second of the rear wheels, said second axle shaft extending to a second side of said gear case, said first side and said second side being opposite sides on said gear case, said gear case being disposed offset from the centerline of the vehicle such that said gear case is adjacent to the second wheel;

gearing in said gear case, said drive shaft and said axle shafts being coupled with said gearing;

a friction brake within said gear case coupling said gearing and said gear case, said friction brake including multiple friction disks; and actuation means for engaging said friction brake between said gearing and said gear case, including a cam plate, a pressure plate, follower elements between said cam plate and said pressure plate and cam surfaces on one of said cam plate and said pressure plate, said cam plate being rotatably mounted in said gear case to advance said pressure plate against said friction disks upon rotation thereof.

8. The axle assembly of claim 7 wherein said cam surfaces each include a first section and a second section, said first section being steeper than said second section in cam profile, said second section being outwardly of said first section on said cam profile.

9. An axle assembly for a vehicle having two rear wheels, comprising a gear case having a friction brake pressure surface;

a drive shaft extending to said gear case;

a rear axle housing joined to a first side of said gear case and supported by the vehicle midway between the rear wheels;

a first axle shaft for driving a first of the rear wheels, said first axle shaft extending within said rear axle housing to said first side of said gear case;

a second axle shaft for driving a second of the rear wheels extending to a second side of said gear case, said first side and said second side being opposite sides on said gear case, said gear case being disposed offset from the centerline of the vehicle such that said gear case is adjacent to the second wheel;

gearing in said gear case, said drive shaft and said axles being coupled with said gearing, said gearing including a ring gear, the axis of said drive shaft and the axis of said ring gear defining an included angle of substantially greater than ninety degrees at said gear case;

a friction brake within said gear case coupling said ring gear and said gear case, said friction brake including friction disks, at least one of said friction disks being fixed to rotate with said ring gear and at least one other of said friction disks being fixed from rotation by said gear case, said friction brake being positioned in said included angle; and actuating means including a pressure plate for compressing said friction disks against said pressure surface on said gear case to brake said axles.

10. A rear axle assembly for a vehicle having a vehicle frame and two driven rear wheels, comprising:

a gear case disposed in offset relation to the vehicle centerline having an oppositely spaced first and second sides and a friction surface formed on the interior surface thereof;

a rear axle housing joined to said first side of said gear case and supported by the vehicle frame intermediate said rear wheels;

a first rotatable axle shaft for driving a first of the rear wheels, said first axle shaft extending from within said rear axle housing to said first side of said gear case;

a drive shaft extending to said gear case and having a bevel gear fixed thereto for rotation therewith;

a second rotatable axle shaft for driving a second of the rear wheels, said second axle shaft extending to said second side of said gear case;

differential gearing in said gear case including a differential case rotatably mounting first and second pinion gears operative to drive said first and second axle shafts, respectively, and a ring gear fixed to said differential case and driven by said bevel gear to transmit drive power from said drive shaft to said rear wheels;

a friction disk brake within said gear case operative between said ring gear and said friction surface; and actuation means for selectively securing said friction disk brake between said ring gear and said gear case.

* * * * *